United States Patent [19]

Donald, III

[11] 4,301,833

[45] Nov. 24, 1981

[54] FLOW RESPONSIVE SAFETY VALVE

[76] Inventor: Robert A. Donald, III, 3003 Colonial Hill Rd., Louisville, Ky. 40205

[21] Appl. No.: 82,179

[22] Filed: Oct. 5, 1979

[51] Int. Cl.³ .............................................. F16K 15/00
[52] U.S. Cl. ...................................... 137/521; 137/527
[58] Field of Search .............. 137/484, 498, 499, 517, 137/521, 527; 251/305, 306

[56] References Cited

U.S. PATENT DOCUMENTS

| | | | |
|---|---|---|---|
| 965,322 | 7/1910 | Peterson | 251/305 |
| 1,744,798 | 1/1930 | Price | 137/527 |
| 2,128,266 | 8/1938 | Quinn | 137/499 |
| 2,228,733 | 1/1941 | Reichhelm et al. | 251/305 |
| 2,803,261 | 8/1957 | Carlson | 137/499 |
| 3,113,593 | 12/1963 | Vicard | 251/305 |
| 3,941,151 | 3/1976 | Biddle | 251/306 |
| 3,965,928 | 6/1976 | Siegwart | 137/521 |
| 3,996,961 | 12/1976 | Siegwart | 137/517 |
| 4,088,150 | 5/1978 | Serratto | 137/521 |

FOREIGN PATENT DOCUMENTS

| | | | |
|---|---|---|---|
| 1600948 | 5/1970 | Fed. Rep. of Germany | 137/521 |
| 2023961 | 11/1971 | Fed. Rep. of Germany | 137/527 |
| 1313310 | 11/1962 | France | 137/521 |
| 394221 | 6/1933 | United Kingdom | 137/527 |
| 209961 | 2/1968 | U.S.S.R. | 137/527 |

*Primary Examiner*—Martin P. Schwadron
*Assistant Examiner*—H. Jay Spiegel
*Attorney, Agent, or Firm*—Laurence R. Brown

[57] ABSTRACT

An automatic safety flow valve for fluid gas or liquid conveying conduits has a fluo-dynamically surface substantially flat plate eccentrically pivoted to turn in response to fluid flow rates above a normal threshold from a position substantially parallel to the flow path to a position retarding or stopping the flow.

6 Claims, 8 Drawing Figures

FLOW RESPONSIVE SAFETY VALVE

TECHNICAL FIELD

This invention relates to flow valves for control of fluids through a conduit and more particularly it relates to a fluid flow responsive device for automatically correcting an excessive flow condition through a conduit.

BACKGROUND ART

Flow regulation and safety valves of various sorts are known in the art for flow regulation of fluids such as gases and liquids. The following U.S. patents are representative of the state of this art.

| | | |
|---|---|---|
| 4,141,380 - Feb. 27, 1979 | Lenk | |
| 3,996,961 - Dec. 14, 1976 | Siegwart | |
| 3,973,410 - Aug. 10, 1976 | Putman et al. | |
| 3,965,928 - June 29, 1976 | Siegwart | |
| 3,841,350 - Oct. 15, 1974 | Griensteidl et al. | |
| 2,131,025 - Sept. 27, 1938 | Danel | |

This prior art, however, has a significant deficiency in that the valves when inserted into a fluid flow path greatly disturb the flow pattern causing significant turbulence and flow losses because they present a substantial cross section in the flow path or require special orifices or flow contortions in their operation.

It is therefore an object of this invention to provide improved flow regulation safety valve means operable in response to fluid flow without introducing significant losses or turbulence into the routine normal fluid flow path.

BRIEF DISCLOSURE OF THE INVENTION

This invention provides a safety flow valve to automtically shut off fluid gas or liquid flow through a conduit flow path when the flow rate increases beyond a predetermined threshold as might occur, for example, if a pipe were broken and leakage caused an increase in flow beyond normal expected maximum flow rates.

The valve mechanism for achieving this is not only simple and inexpensive but is substantially fool-proof and offers very little resistance or turbulence to normal flow rates through the conduit.

Thus, a substantially flat plate having eccentric off center pivot mounts is positioned parallel to the fluid flow path so that it can be turned by an appropriate turning moment into a position substantially normal to the flow path thereby deterring flow. The turning moment is supplied by fluid flow on a fluo-dynamic valve surface similar to an airplane wing lift surface when the flow rate exceeds a predetermined threshold such as may be established for example by counter rotational bias of a threshold spring setting.

Further objects, features and advantages of the invention will be found throughout the following description made with reference to the accompanying drawing.

DETAILED DESCRIPTION OF PREFERRED EMBODIMENTS

Figure 1:
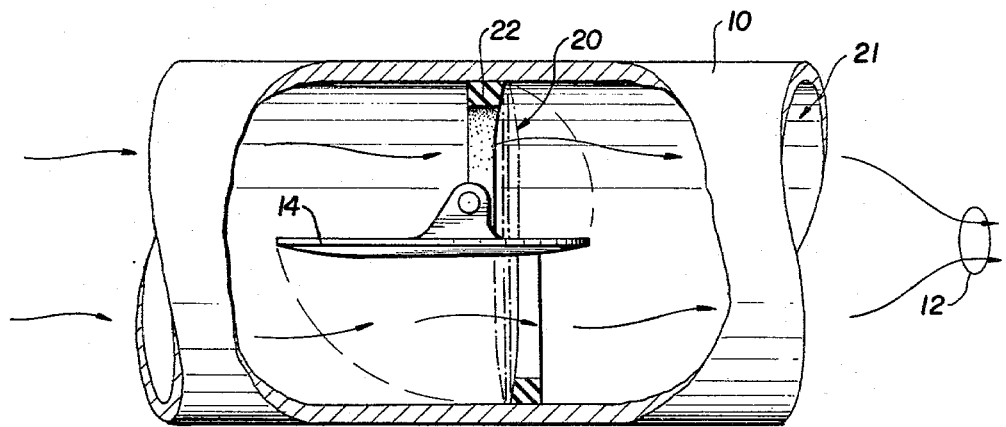
FIGS. 1 and 2 are respective broken away side and end views, partly in section of a fluid conduit pipe and the associated safety valve as provided in accordance with this invention.

Throughout the various views of the drawing, like reference characters refer to similar features to facilitate comparison. Primed reference characters indicate variations of basic elements.

Figure 2:
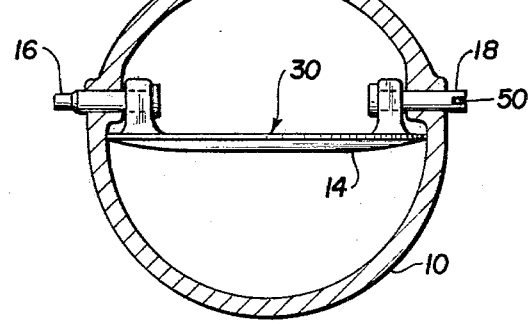

As may be seen in FIGS. 1 and 2 a fluid conduit, in this embodiment cylindrical pipe 10, typically plastic or metallic, has flowing therein a fluid gas or liquid such as air or water in the general axial flow path represented by arrows 12.

The substantially flat valve plate member 14 is pivoted eccentrically on pivot pins 16, 18 to move between a normal flow rate position parallel to the axial direction of flow as shown in solid lines and a pipe closure position perpendicular to the axial direction of flow as shown by phantom lines 20 which thereby retards or stops flow out of pipe exit 21. An appropriate elastic sealing ring 22 may be used if a sealing relationship is desired upon operation of the safety valve into the retard position.

Figure 3:
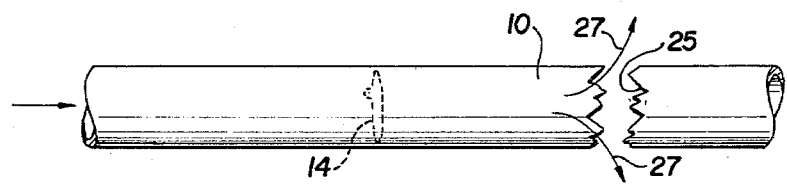
FIG. 3 is a diagrammatic sketch of a water pipe or the like illustrating catastrophic failure conditions where the safety valve comes into play.

The operation of the safety valve member 14 is bistable in nature. Thus, it rests in either the axial or flow state parallel to flow or the flow retarding state perpendicular to the flow axis as shown by phantom lines 20. The transition from flow state to retarding state is automatic in response to the rate of flow within the conduit pipe 20. Thus, as seen from FIG. 3 if a water pipe 10 is accidental and catastrophically cut as at 25 to release the full capacity of flow at 27 then the rate of flow will increase enough to move safety valve 14 to the flow retardation state shown to prevent further loss of water from the pipe. By similar action air or gas flow is also protected.

The valve 14 effects this as a result of fluodynamic surface structure 30. This construction is similar to an airplane wing which passes the fluid flow over the plate (wing) with little resistance and turbulence as evidenced in FIG. 4A, but provides a lift or in the case of the valve a turning moment indicated by arrow 31.

Figure 4A:
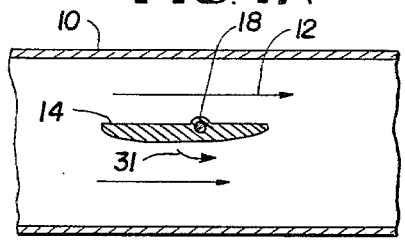
FIGS. 4A, 4B and 4C are diagrammatic sketches illustrating operation conditions affecting the safety valve in various pivot positions.
Figure 4B:
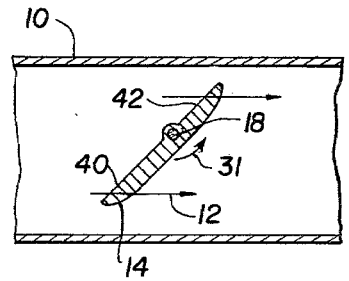

By biasing means such as a counter-rotation threshold spring, the valve is held parallel to the flow at expected normal flow rates as in FIG. 4A. However, at flow rates exceeding this threshold the turning moment 31 is effective to overcome the bias and rotate valve 14 on its eccentric pivot axis 18 as shown in FIG. 4B.

When this occurs the upstream face of the plate valve member 14 confronts the flowing fluid and develops a further and substantial supplemental force increasing the turning moment. Because of the eccentric mount, a greater force will be exerted on the greater area of upstream plate surface 40 exposed below the pivot axis 18 as shown in FIG. 4B than will be exerted on the area of upstream plate surface 42 above the pivot axis 18. This causes a rapid snap action closure to the perpendicular to flow axis state shown in FIG. 4C where flow is stopped and the fluid 44 is restrained from flowing past valve plate 14.

Figure 5:
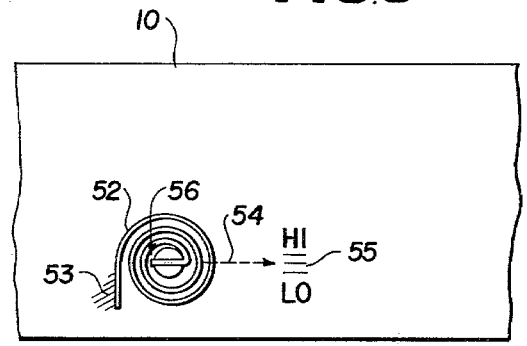
FIG. 5 is a diagrammatic sketch of a counterrotational biasing spring embodiment permitting selection of a variable predetermined flow threshold.

The counterrotational bias force may be applied in the manner sketched by FIG. 5, wherein a screwdriver slot 50, as shown also in FIG. 1, may carry one end of a spiral bias spring 52 affixed at the other end 53 to the pipe 10. If the pin (which might be pivot pin 18) is frictionally held the screwdriver slot 50 can rotate the spiral spring body to increase or decrease bias and thus set the threshold level that need be overcome before the valve plate can be rotated by the fluid flow. A pointer 54 may be provided if desired with a calibrated dial 55.

Figure 6:
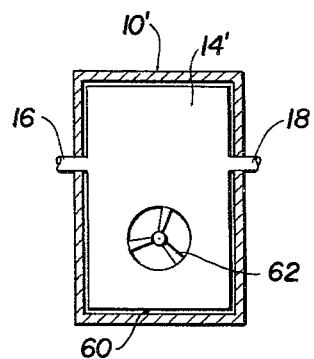
FIG. 6 is an end view, partly in section of a further embodiment of the safety valve structure afforded by this invention.

While it is to be recognized that the above discussed embodiment operates in the spirit of the invention, it is also to be recognized that certain variations might be desirable in various operating conditions. Accordingly, reference to FIG. 6 shows several alternative features, including a rectangular shaped conduit pipe 10'.

Figure 4C:
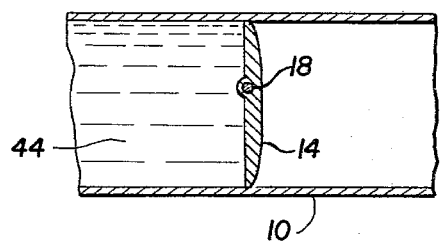

The principle of operation remains similar as to the bistable states and the turning moments. However, it is sometimes permissible or desirable merely to retard excessive flow without full stoppage of flow as depicted in FIG. 4C. Thus, a margin 60 about plate 14' permits some fluid to flow past the valve plate 14 when in a flow retardation state perpendicular to the axis of flow. Also a spring loaded vent closure 62 can serve this purpose. Similarly it is clear that the plate 14 need not be disposed perpendicular to flow since it can be stopped short of a full 90° angle and yet otherwise retard the flow in the manner aforesaid. Stops such as the dimensions of the plate and piping then can intercept the valve plate short of the full 90° swing required to rest in a substantially normal position. Other such variations are feasible and sometimes desirable.

Having therefore set forth those features and embodiments representative of the invention, those features of novelty believed descriptive of the spirit and nature of the invention are set forth with particularity in the appended claims.

INDUSTRIAL APPLICATION

An automatic flow regulator responsive to gas or liquid fluid flow in a conduit above normal, as caused for example by catastrophic failure when the conduit bursts, serves to limit or stop the flow automatically. The flow regulator comprises an inexpensive and simple valve which under normal flow conditions does not significantly retard flow or introduce turbulence.

In the claims:

1. A shut off safety valve for flow control of fluid liquids and gases through a conduit transport path responsive to flow rates exceeding predetermined limits, comprising, a plate valve member eccentrically mounted off center in said conduit path to establish by fluid flow therepast a stable position not substantially impeding fluid flow and engaging the conduit only by means of pivot members to pivot from an open position parallel to fluid flow through the conduit to a closed position substantially reducing the flow of fluid and presenting airplane wing type surface structure with a substantially flat surface on one side and curved surface on the other side responsive to fluid flow at a flow rate above a predetermined threshold past both said surfaces for providing a lift to pivot the valve member in response to the fluid flow from the open position toward the closed position where it is aided in closure and kept closed by fluid pressure in the conduit as a function of the off center eccentric mount.

2. A valve as defined in claim 1 having counterrotational biasing means establishing the threshold magnitude.

3. A valve as defined in claim 1 wherein the valve plate member is substantially circular in shape and the conduit is a cylindrical pipe.

4. A valve as defined in claim 1 including means in said flat plate permitting passage of fluid therethrough in a closed position.

5. A valve responsive to fluid flow adapted for mounting in a fluid conduit member comprising in combination, a plate member constructed to fit into the conduit in a position parallel to fluid flow to permit fluid flow thereby under a threshold level of fluid flow to establish a stable position not impeding fluid flow therepast and without substantial resistance or turbulence, and mounting means consisting of pivot members extending from the plate eccentrically for disposing the plate pivotably in the conduit member to pivot from the position substantially parallel to fluid flow into a position retarding fluid flow, said plate including airplane wing type surface structure with a substantially flat surface on one side and a curved surface on the other side to provide a lift in response to fluid flow past both surfaces of said plate for pivoting from the parallel position toward the position retarding fluid flow through the conduit member in response to flow of fluid through the conduit member above the threshold flow level whereby the fluid flow encounters the plate surfaces and by action of the eccentrically disposed pivot members aids the plate in pivoting to attain said position retarding fluid flow.

6. The valve defined in claim 5 wherein the means inducing a turning moment comprises fluodynamic surface means on said member adapted to respond to fluid flow to exert a moment on said plate member tending to move it from the position parallel to the flow of fluid into the position normal to the flow of fluid.

* * * * *